June 6, 1950

N. C. LOCKE 2,510,704

GREEN CROP HARVESTER

Filed Nov. 26, 1946

INVENTOR
Niel C. Locke
BY
Webster & Webster
ATTORNEYS

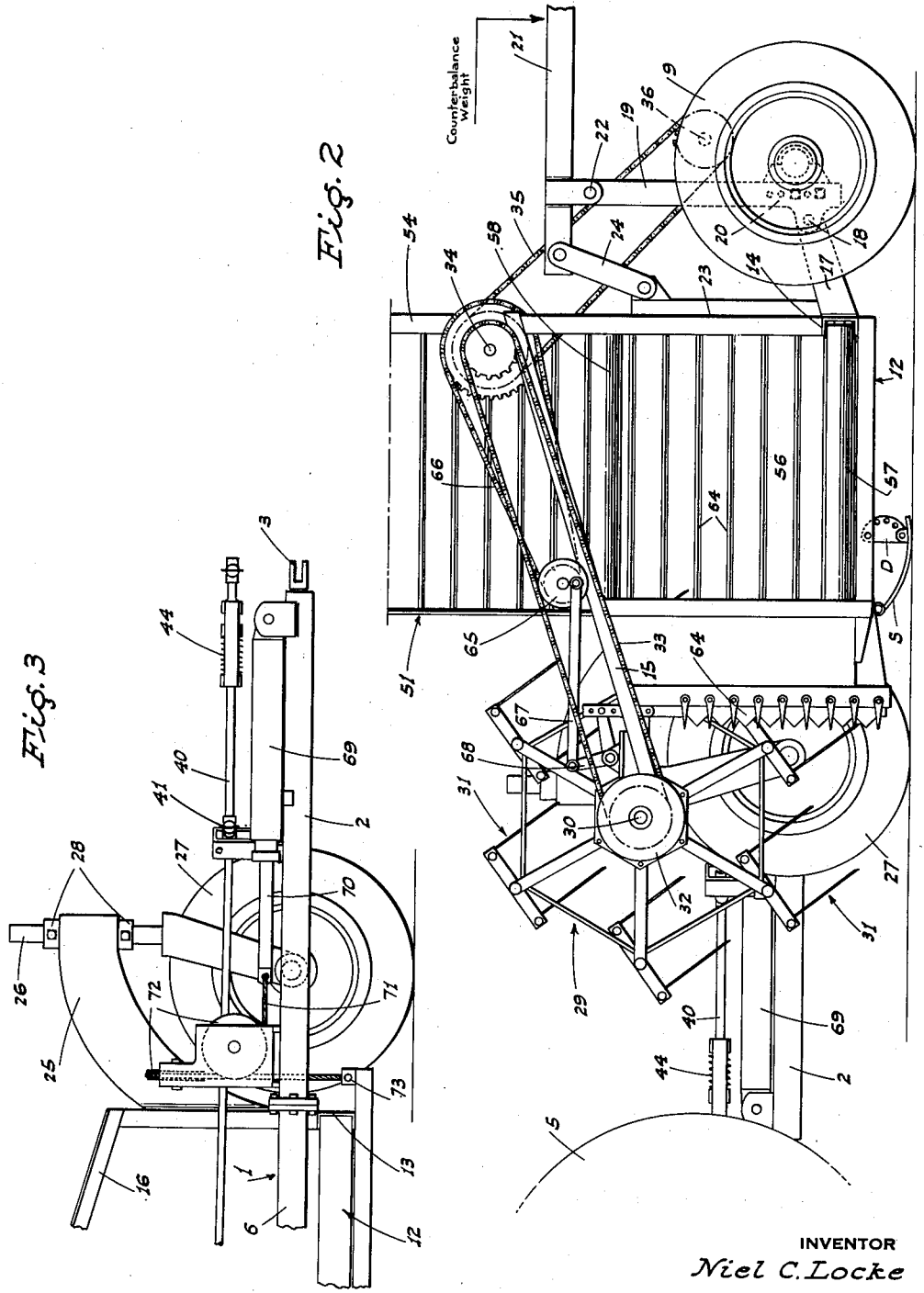

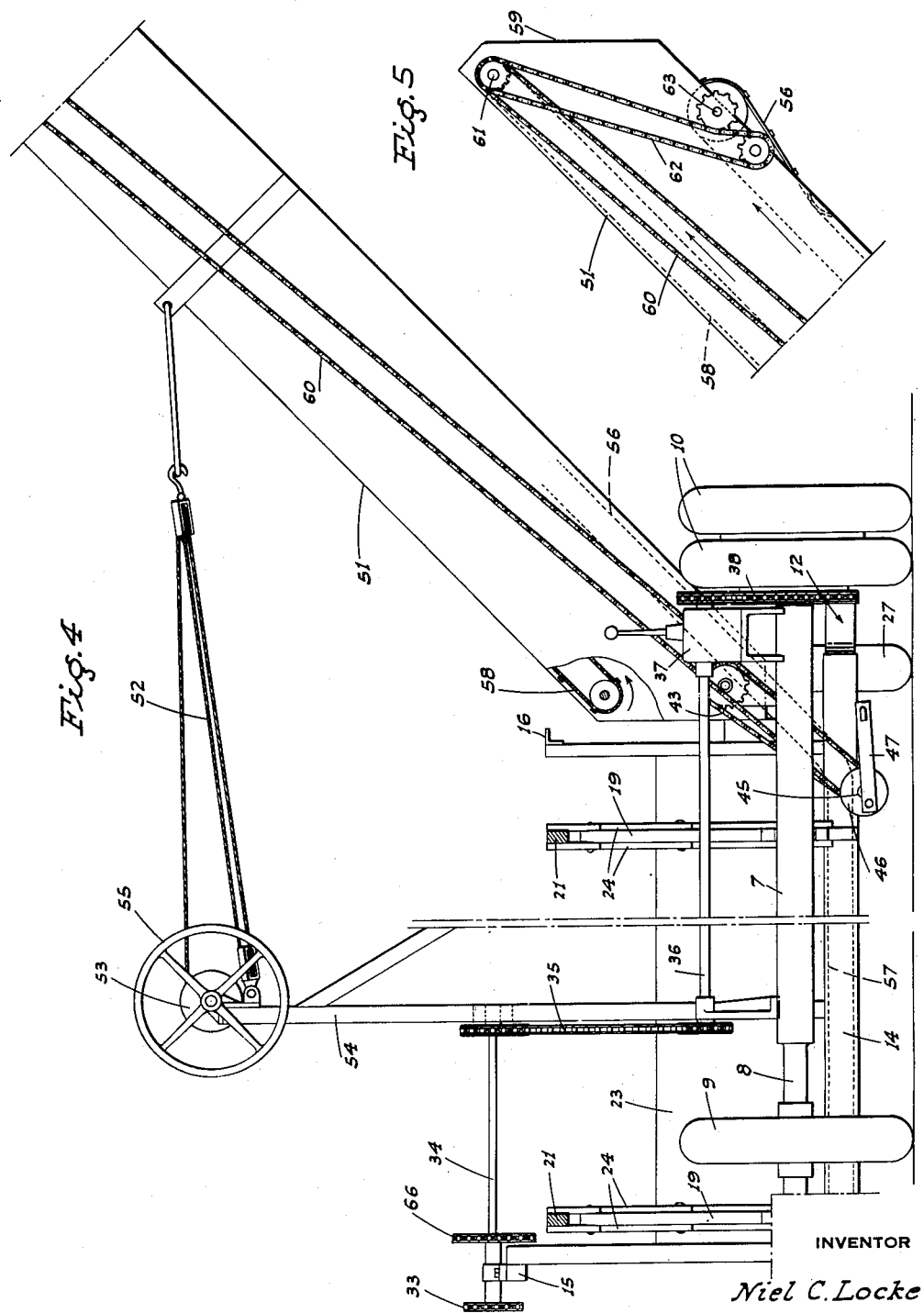

Patented June 6, 1950

2,510,704

UNITED STATES PATENT OFFICE 2,510,704

GREEN CROP HARVESTER

Niel C. Locke, Lockeford, Calif.

Application November 26, 1946, Serial No. 712,391

4 Claims. (Cl. 56—23)

This invention is directed to, and it is an object to provide, an improved green crop harvester for use to harvest crops such as peas, spinach, oats, vetch, etc.; the implement being arranged to deliver the cut crop into a receiving truck traveling alongside.

Another object of the invention is to provide a green crop harvester which is designed so that it functions effectively to cut and recover crops which may be badly tangled or weed grown, or of excessively heavy growth, as sometimes occurs in pea crops, for example.

A further object of the invention is to provide a green crop harvester which comprises a pick-up reel, a sickle bar assembly, and an elevator conveyor carried by a floating or header frame arranged in novel combination with a wheel-supported main frame; the floating frame being vertically movable, by power means, for making turns in the field, or for permitting of adjustment of the working level of the implement.

An additional object of the invention is to provide a green crop harvester, as above, wherein the sickle bar assembly includes a horizontal sickle bar unit, and a vertical sickle bar unit at the outboard end of said first named unit, whereby to fully sever the cut crop, on each pass from laterally adjacent, uncut portions which may be initially entangled therewith.

It is also an object to provide means for driving the pick-up reel, horizontal sickle bar unit, vertical sickle bar unit, and elevator conveyor, at speeds best adapted for the purposes which such parts of the implement serve.

A further object of the invention is to provide a practical, efficient, and rugged green crop harvester, and one which will be exceedingly effective for the purpose for which it is designed.

These objects are accomplished by means of such structure and relative arrangement of parts as will fully appear by a perusal of the following specification and claims.

In the drawings:

Fig. 2 is a fragmentary side elevation of the harvester taken from the side opposite the elevator conveyor spout.

Fig. 3 is a fragmentary side elevation of the implement taken from the other side, illustrating mainly the caster wheel mount and the power actuated means for vertically moving or elevating the floating or header frame.

Fig. 4 is a fragmentary rear end view of the machine.

Fig. 5 is a fragmentary elevation showing the upper portion of the elevator conveyor spout, and the drives for the top and bottom drapers therein.

Figure 1:
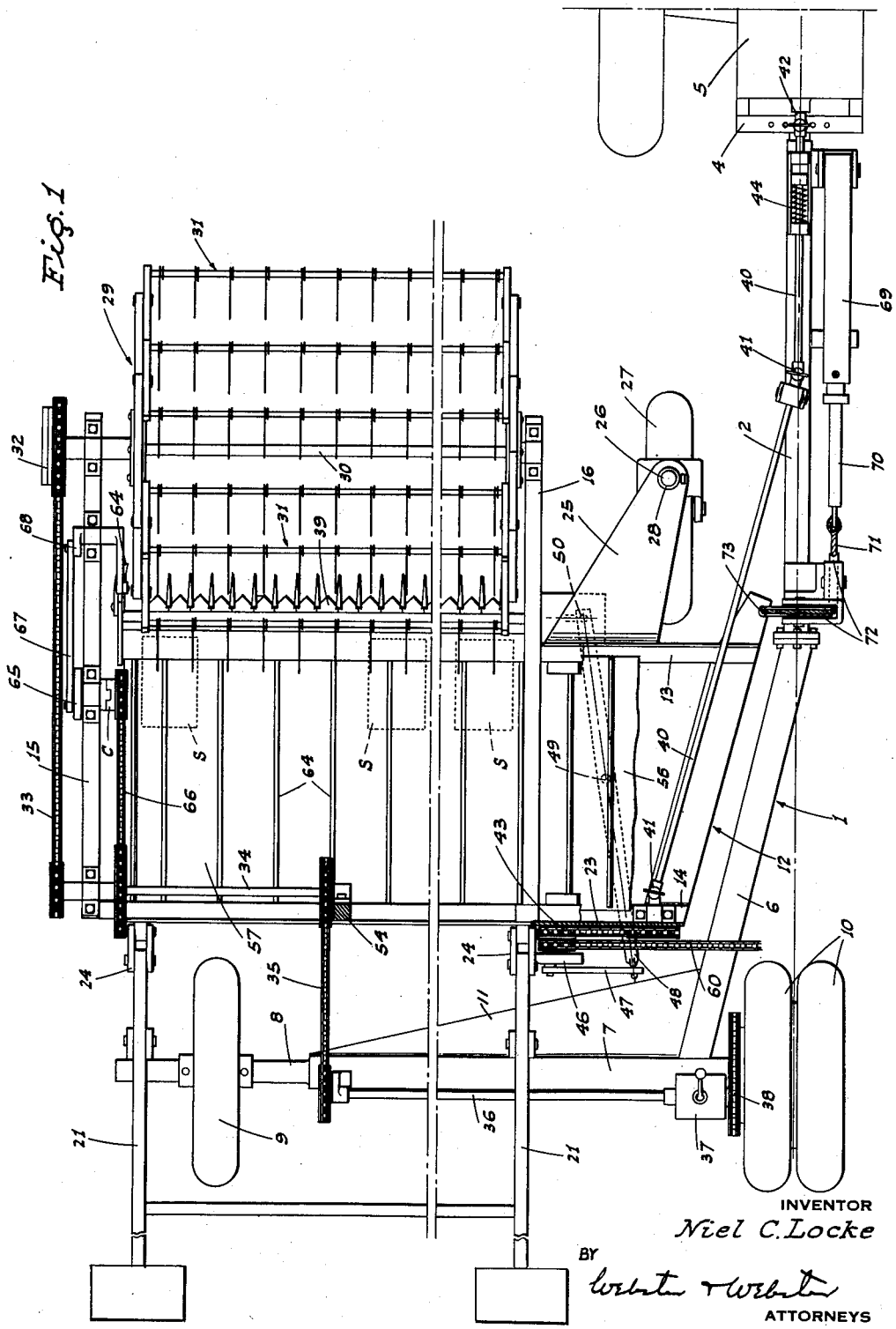
Fig. 1 is a plan view of the improved green crop harvester, partly broken away.

Referring now more particularly to the characters of reference on the drawings, the improved green crop harvester comprises a main frame, indicated generally at 1, which main frame includes a longitudinally extending rigid tongue 2 fitted, at its forward end, with a vertical-axis clevis 3 adapted to be coupled to the transverse hitch bar 4 of a tractor, indicated in part at 5.

At its rear end the rigid tongue 2 is fixed in connection with a laterally diagonaling frame bar 6 which extends rearwardly to rigid connection with one end portion of a rear cross bar 7, which cross bar projects laterally outwardly at right angles to the line of draft. The rear cross bar 7 carries spindles at opposite ends, the outer end spindle being shown at 8, and has a pneumatic-tired wheel 9 journaled thereon for adjustment along said spindle. At the opposite end of the rear cross bar 7 the adjacent spindle carries dual, pneumatic-tired wheels 10. A web 11 connects the frame bar 6 and rear cross bar 7 in rigid, reinforced relation.

The above described wheel-supported main frame 1, when coupled to the tractor 5, trails the latter in mainly laterally outwardly offset relation, with the line of draft, as shown by broken line in Fig. 1, passing centrally between the wheels 10.

A floating or header frame, indicated generally at 12, is disposed ahead of the rear cross bar 7, and is constructed and mounted as follows:

The floating frame 12 includes a front cross beam 13 and a rear cross beam 14 disposed in parallel, spaced-apart relation, together with transversely spaced, relatively elevated side beams 15 and 16; said side beams sloping forwardly and downwardly, and projecting ahead of the front cross beam 13 to a termination some distance forwardly of the latter.

At its rear end the floating frame 12 is pivotally connected to the rear cross bar 7, for up and down floating motion, by means of a pair of transversely spaced rigid arms 17 which project rearwardly from the rear cross beam 14, and pivotally connected, as at 18, with upstanding posts 19 vertically adjustably secured, as at 20, in connection with said rear cross bar 7.

A transversely spaced pair of longitudinally extending counterbalance arms 21 are pivoted, as at 22, to the upper ends of posts 19, said arms 21 projecting a short distance ahead of such posts, and there being connected with an upstanding back wall 23 of the floating frame 12 by means of pivotally connected links 24.

Counterbalancing weights are applied to the arms 21 rearwardly of the posts 19 whereby to counterbalance the floating frame 12 and the hereinafter described working parts carried thereby.

The floating frame 12 is supported from the ground, adjacent its forward end and between the side beams 16 and the rigid tongue 2, by the following arrangement:

A rigid gooseneck 25 is fixed in connection with the floating frame and projects forwardly, and the vertical spindle 26 of a caster wheel unit 27 is vertically adjustably journaled, in the forward end of said gooseneck, by means including top and bottom adjustment collars 28. The working level of the implement lengthwise thereof is initially set by adjustment of the collars 28, whereas the horizontal working level of the implement is predetermined by the adjustable mounts 20.

In addition, frame 12 is supported by shoes S pivotally hung from beam 13, and which are provided with adjustment devices D. When the desired working level of the floating frame has been determined, the shoes are adjusted accordingly. This stabilizes the action of the sickle and header which are mounted on said frame as later descsibed.

The working parts of the implement, as carried by the floating frame, comprise the following:

A pick-up reel, indicated generally at 29, is journaled in connection with, and extends between, the forward ends of the side beams 15 and 16 ahead of the front beam 13; said pick-up reel 29 including a center shaft 30. The pick-up reel 29 is of a generally conventional type, except that multiple-rod pick-up finger units, indicated generally at 31, are employed instead of the usual single-rod pick-up finger units between corresponding pairs of the radial arms of the reel. This increases the effectiveness of the reel, as it greatly multiplies the number of pick-up fingers in operation.

From its outboard end, the center shaft 30 of the pick-up reel is driven through a friction clutch 32 by an endless chain and sprocket unit 33 which leads rearwardly to a transverse countershaft 34. The provision of the friction clutch enables the reel to stop or slow down, when encountering foreign material, without shock or vibration. The countershaft 34 extends laterally inwardly toward the center of the implement, and is there driven by a rearwardly extending endless chain and sprocket unit 35 connected to a cross shaft 36 journaled in connection with the rear cross bar 7. A change-speed transmission 37 is interposed in the cross shaft 36; the latter being driven at the adjacent end from the dual wheels 10 by an endless chain and sprocket unit 38.

Directly to the rear of the pick-up reel 29 the floating frame 12 is fitted, adjacent and front of the front cross beam 13, with a horizontal, transversely extending sickle bar unit 39. This horizontal sickle bar unit 39 is driven in the following manner:

A drive shaft assembly, indicated generally at 40, and including suitable universal connections 41 therein, leads from the power take-off shaft 42 on the tractor 10 rearwardly to the rear cross beam 14 adjacent the inner end of the latter, where said drive shaft assembly 40 is coupled, in driving relation, to an endless chain and sprocket unit 43. The drive shaft assembly 40 includes, adjacent the tractor, a safety clutch 44.

The endless chain and sprocket unit 43 drives a countershaft 45, which carries a pitman 46 on a longitudinal horizontal axis. A connecting rod 47 couples the pitman 46 to the adjacent end of a horizontally swingable, motion-transmitting lever 48 pivoted, intermediate its ends, as at 49, on the floating frame for swinging in a horizontal transverse plane. The forward end of the motion-transmitting lever 48 is pivoted, as at 50, to one end of the horizontal sickle bar unit 39. In the above manner said horizontal sickle bar unit 39 is driven from the power take-off shaft 42 of the tractor.

An elongated spout 51 is hinged at its lower end in connection with the floating frame 12 adjacent the side beam 16, and thence extends at an upward and laterally outward incline in a direction overhanging the frame bar 6, said spout being adjustable, as to its angle of inclination, by means of a cable system 52 leading from a windlass 53 mounted on an upstanding post unit 54 on the floating frame; said windlass including a hand wheel 55 and a suitable latch (not shown).

The spout 51 carries an endless elevator conveyor therein, which conveyor includes an endless bottom draper 56 which extends downwardly in the spout 51 and thence turns about suitable guide means and extends laterally across the floating frame 12 behind the horizontal sickle bar unit 39 as a horizontal run 57. As the horizontal run 57 is an intergral part of the bottom draper 56, back feeding is minimized between said run and the remainder of the elevator conveyor. The bottom draper 56 is suitably crosscleated to assure of positive feeding. The elevator conveyor of the implement also includes an endless top draper 58, likewise cross-cleated and running in the spout 51 in spaced relation above the inclined portion of the bottom draper 56. The top draper 58 assures of positive feeding within the spout 51, and prevents any retraction of the cut crop as it is fed through said spout.

The spout 51 is open, at its upper end, as at 59, for discharge of the cut crop from the cooperating drapers 56 and 58 into the open body of a truck traveling along the implement.

The endless drapers 56 and 58 are simultaneously driven in proper directions from the countershaft 45 in the following manner:

A relatively long endless chain and sprocket unit 60 is connected between said countershaft 45 and the top cross shaft 61 of the top draper 58 in actuating relation to the latter. A reversing endless chain and sprocket unit 62 connects between the top cross shaft 61 of the draper 58 and the top cross shaft 63 of the bottom draper 56. In this manner the elevator conveyor within the spout 1 is actuated from the power take-off shaft 42 of the tractor simultaneously with the power drive of the horizontal sickle bar unit 39.

A vertical sickle bar unit 64 is mounted in forwardly facing position at the outboard end of the horizontal sickle bar unit 39, and is suitably supported in connection with the floating frame. This vertical sickle bar unit 64 is actuated by a pitman 65 driven by an endless chain and sprocket unit 66 from the wheel drive countershaft 34. Unit 66 includes a safety clutch C to protect the sickle from damage by contact with foreign material. The pitman 65 is disposed above and to the rear of the vertical sickle bar unit 64 on a horizontal transverse axis, and the driving connections between said parts comprise:

A connecting rod 67 is secured to the pitman 65 and leads forwardly to one leg of bellcrank 68; the other leg being secured in operative relation to the upper end of the movable portion of the vertical sickle bar unit 64.

In order to raise the floating frame 12 to clear the working parts thereon from the ground when it is desired to make turns in the field, or for the purpose of effecting manual adjustment of the caster wheel 27, the following mechanism is employed.

A longitudinally extending fluid pressure actuated power cylinder 69 is mounted in connection with, and extends along, the rigid tongue 2; the piston rod 70 of said cylinder being secured to a cable 71, which leads about direction-changing sheaves 72 and thence depends to connection, as at 73, with the floating frame 12. The piston rod 70 is normally advanced, but when the cylinder 69 is actuated to retract said rod, the cable 71 is pulled in a direction to raise the floating frame 12, together with the working parts carried thereon. The power cylinder 69 is controlled by the tractor operator through the medium of a valved fluid pressure system (not shown).

In operation of the described implement, the floating frame 12 is first adjusted to a selected working level in the manner previously described, and thereafter said frame may float as it traverses uneven ground; the caster wheel 27 and shoes S supporting the floating frame at its forward end, while its rearward end is pivotally mounted and counterbalanced, as described.

As the implement advances in the field, the pick-up reel 29 works to engage, pick up, and deliver the crop to the horizontal sickle bar unit 39, whence the cut crop falls onto the horizontal run 57 of the endless conveyor.

At the outboard end of the sickle bar unit 39, which runs adjacent the uncut portion of the crop, the vertical sickle bar unit 64 functions to sever the cut crop from the uncut. This is advantageous because of the fact that between the cut and uncut portions of the drop there is usually a relatively heavy entanglement. If it were not for the vertical sickle bar unit 64, difficulties would be encountered, as a clean severance would not be accomplished.

As delivered to the horizontal run 57 of the endless conveyor, the cut crop travels transversely and enters the spout 51, whence it is elevated by the drapers 56 and 58 for delivery out of the open upper end of said spout and into the truck which is traveling alongside.

The change-speed transmission 37 makes possible the actuation of the pick-up reel 29 and the vertical sickle bar unit 64 at the same but selective speeds, depending on working conditions. Under certain working conditions it is desirable that the pick-up reel 29 and the vertical sickle bar unit 64 travel relatively slow, while under other conditions faster operation is desirable. With the arrangement described, this variance in speed may be accomplished without in any way affecting the drive of the horizontal sickle bar unit 39 and the drapers 56 and 58, as these latter working parts are power driven from the take-off shaft 42 of the tractor.

The described green crop harvester functions effectively and economically in connection with the harvesting of green crops or the like, and it is designed so that it may work in crops which are heavily overgrown or entangled downed by wind, or badly weed grown.

Further, the construction of the harvester is rugged, and it will provide long service with a minimum of maintenance or repair.

From the foregoing description it will be readily seen that there has been produced such a device as will fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. In a harvester which includes a main wheel supported frame, a floating frame, transversely spaced upstanding posts fixed on the main frame, transversely spaced arms rigid with the floating frame and extending rearwardly therefrom, means pivotally connecting the outer ends of said rigid arms with the posts adjacent the lower ends of the latter, transversely spaced counterbalance arms pivoted intermediate their ends to the posts above said rigid arms, links pivoted to the forward ends of the counterbalance arms and to the floating frame at points above said rigid arms, and a crop cutting and conveying mechanism carried on the floating frame.

2. A combination as in claim 1 including adjustment elements between the posts and main frame for vertically adjusting the posts relative to the main frame.

3. A combination as in claim 1, including a goose neck rigid with and projecting from the side of the floating frame opposite that side from which the rigid arms project, a caster wheel, and a vertical spindle on the caster wheel journaled in the outer end of the goose neck.

4. A combination as in claim 3 including adjustment elements between the goose neck and spindle for adjusting the goose neck vertically along the spindle.

NIEL C. LOCKE.

REFERENCES CITED

The following references are of record in the file of this patent:

UNITED STATES PATENTS

| Number | Name | Date |
|---|---|---|
| 1,294,675 | Kiner | Feb. 18, 1919 |
| 1,917,352 | Apel | July 11, 1933 |
| 1,954,629 | Kettenbach et al. | Apr. 10, 1934 |
| 1,960,596 | Rimple | May 29, 1934 |
| 2,147,267 | Pierson | Feb. 14, 1939 |
| 2,284,517 | Fink | May 26, 1942 |
| 2,310,387 | Blair et al. | Feb. 9, 1943 |
| 2,388,861 | McCann | Nov. 13, 1945 |